(12) United States Patent
Greathouse et al.

(10) Patent No.: US 12,277,020 B2
(45) Date of Patent: Apr. 15, 2025

(54) DEFAULT BOOST MODE STATE FOR DEVICES

(71) Applicants: Advanced Micro Devices, Inc, Santa Clara, CA (US); ATI Technologies ULC, Markham (CA)

(72) Inventors: Joseph Lee Greathouse, Austin, TX (US); Adam Neil Calder Clark, Victoria (CA); Stephen Kushnir, Toronto (CA)

(73) Assignees: Advanced Micro Devices, Inc, Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/561,837

(22) Filed: Dec. 24, 2021

(65) Prior Publication Data

US 2023/0205306 A1    Jun. 29, 2023

(51) Int. Cl.
    *G06F 1/3296*    (2019.01)
    *G06F 1/20*      (2006.01)
    *G06F 1/3206*    (2019.01)
    *G06F 1/3215*    (2019.01)
    *G06F 1/324*     (2019.01)

(52) U.S. Cl.
    CPC .......... *G06F 1/3296* (2013.01); *G06F 1/3215* (2013.01); *G06F 1/206* (2013.01); *G06F 1/3206* (2013.01); *G06F 1/324* (2013.01); *Y02D 10/00* (2018.01)

(58) Field of Classification Search
    CPC ...... G06F 1/3296; G06F 1/3203; G06F 1/206; G06F 1/3206; G06F 1/3215; G06F 1/324; G06F 1/325; Y02D 10/00
    See application file for complete search history.

(56) References Cited

U.S. PATENT DOCUMENTS

| | | | | |
|---|---|---|---|---|
| 7,788,519 B2* | 8/2010 | Bailey | ........... | G06F 1/3296 713/320 |
| 8,006,108 B2* | 8/2011 | Brey | ........... | G06F 1/3203 713/340 |
| 2004/0210779 A1 | 10/2004 | Wang | | |
| 2007/0033425 A1 | 2/2007 | Clark | | |
| 2009/0234511 A1* | 9/2009 | Ouchi | ........... | H02J 3/14 700/291 |

(Continued)

OTHER PUBLICATIONS

PCT/US2022/082013, "International Search Report and Written Opinion", PCT Application No. PCT/US2022/082013, Apr. 25, 2023, 9 pages.

*Primary Examiner* — Terrell S Johnson
(74) *Attorney, Agent, or Firm* — FIG. 1 Patents (57) ABSTRACT

One or more components of a computing device are run by default in a boost mode state. The one or more components continue to run in the boost mode state until the boost mode state is no longer sustainable, e.g., due to power consumption of the one or more components or temperature of the one or more components. The one or more components are switched to a reduced power state (e.g., a non-boost mode state) in response to the boost mode state no longer being sustainable. When operating the one or more components in the boost mode state again becomes sustainable due to power consumption or temperature of the one or more components, the one or more components are returned to the default boost mode state.

20 Claims, 4 Drawing Sheets

(56) References Cited

U.S. PATENT DOCUMENTS

| | | | |
|---|---|---|---|
| 2011/0022857 A1 | 1/2011 | Nussbaum et al. | |
| 2012/0290856 A1* | 11/2012 | Hirano | H04N 1/00896 |
| | | | 713/300 |
| 2014/0304703 A1* | 10/2014 | Larson | G06F 9/4416 |
| | | | 718/1 |
| 2017/0248998 A1 | 8/2017 | Ou Yang | |
| 2017/0359860 A1* | 12/2017 | Howe | G01R 31/44 |
| 2017/0364140 A1* | 12/2017 | Banerjee | G06F 1/08 |
| 2017/0371401 A1* | 12/2017 | Rotem | G06F 9/30145 |
| 2020/0133683 A1* | 4/2020 | Nachimuthu | G06F 9/4403 |
| 2020/0225724 A1* | 7/2020 | Macnamara | G06F 1/3287 |
| 2021/0026428 A1* | 1/2021 | Olarig | G06F 1/206 |
| 2021/0349517 A1 | 11/2021 | Paul et al. | |
| 2022/0100247 A1* | 3/2022 | Garg | G06F 1/30 |

\* cited by examiner

DEFAULT BOOST MODE STATE FOR DEVICES

BACKGROUND

Modern processors include any of various different components, such as a multi-core central processing unit, a graphics processing unit, a memory controller, an input/output controller, and so forth. Many of these different components are configurable to run in different power states, such as run at different frequencies that consume different amounts of power.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Computing devices include various types of components such as one or more processor cores, memory controllers, input/output (I/O) controllers, graphics processing units, image or face recognition units, and so forth. The various components are oftentimes able to operate in multiple different power modes, such as different frequencies, allowing tradeoffs to be made at different times between higher performance and lower power consumption. For example, various components are able to operate in a boost mode state, such as a frequency higher than that which is maintainable long term (e.g., a frequency higher than a frequency used in a steady state that is maintainable indefinitely).

One manner of determining when to run components in a boost mode state is a reactive approach. In a reactive approach, the components are run by default in non-boost mode states that consume less power (e.g., by running at lower frequencies) and are run in a boost mode state in response to certain workloads being performed. As an example, in a reactive approach a high latency workload being performed is detected and one or more components are changed to run in a boost mode state so that they have higher performance (thus decreasing the time it takes for the high latency workload to be performed).

One problem with the reactive approach for determining when to run components in a boost mode state is the time it takes for the determination to be made. For example, in the reactive approach, situations arise where a high latency workload begins and ends before the workload is detected as being a high latency workload. Thus, in the reactive approach by the time the components would begin running in the boost mode state the high latency workload is completed, so the high latency workload gets no benefit from the components running in a boost mode state.

The techniques discussed herein run one or more components of a computing device by default in a boost mode state. Accordingly, when a high latency workload begins the one or more components run that workload in a boost mode state without having to wait for the fact that the workload is high latency to be detected. The one or more components continue to run in the boost mode state until, e.g., the boost mode state is no longer sustainable due to power consumption of the one or more components or temperature of the one or more components. The one or more components are switched to a reduced power state (e.g., a non-boost mode state) in response to the boost mode state no longer being sustainable. When operating the one or more components in the boost mode state again becomes sustainable due to power consumption or temperature of the one or more components, the one or more components are returned to the default boost mode state. Thus, rather than a reactive approach, the techniques discussed herein provide a proactive approach to running workloads, including short high latency workloads, quickly.

In some examples, the techniques described herein relate to a method including: setting each of one or more components of a computing device in a boost mode state; detecting that at least one of the one or more components is power restricted or thermally restricted; and setting, in response to detecting that the at least one component is power restricted or thermally restricted, the at least one component in a reduced power state.

In some examples, the techniques described herein relate to a method, the boost mode state including a higher power consumption setting than a steady state, the steady state being a maintainable state at which the at least one component is able to operate indefinitely without exceeding a power threshold or thermal threshold for the at least one component.

In some examples, the techniques described herein relate to a method, the one or more components including multiple components, the method further including repeating the detecting and setting for each of the multiple components seriatim.

In some examples, the techniques described herein relate to a method, the method further including: detecting that the one or more components are able to return to the boost mode state, and returning the one or more components to the boost mode state seriatim in a same order in which the one or more components were set to the reduced power state.

In some examples, the techniques described herein relate to a method, the one or more components including multiple components, the method further including selecting the reduced power state for each of the multiple components to reduce power consumption of each of the multiple components proportionally.

In some examples, the techniques described herein relate to a method, further including selecting, as the at least one component, from the one or more components in an order beginning with a component of the one or more components having a highest power saved with a lowest performance loss in the reduced power mode.

In some examples, the techniques described herein relate to a method, entering the boost mode state in response to receiving an indication that a screen or display of the computing device is powered on.

In some examples, the techniques described herein relate to a method, wherein the boost mode state of the at least one component includes the at least one component running at a higher frequency than when in a steady state.

In some examples, the techniques described herein relate to a method, wherein the boost mode state of the at least one component includes the at least one component having a larger number of active channels than when in a steady state.

In some examples, the techniques described herein relate to a method, wherein the boost mode state of the at least one component includes using a routing algorithm of the at least one component having a higher performance and using more power than a routing algorithm used in a steady state.

In some examples, the techniques described herein relate to a method, wherein the boost mode state of the at least one component includes decreasing backpressure for network messages for the at least one component than when in a steady state.

In some examples, the techniques described herein relate to a system including: a power reduction determination module to determine how to reduce power consumption of at least one of one or more components of a computing device in response to the one or more components being power restricted or thermally restricted; and a configuration setting determination module to set the at least one component in a boost mode state as a default power configuration state, and subsequently in a reduced power state as determined by the power reduction determination module.

In some examples, the techniques described herein relate to a system, the boost mode state including a higher power consumption setting than a steady state, the steady state being a maintainable state at which the at least one component is able to operate indefinitely without exceeding a power threshold or thermal threshold for the at least one component.

In some examples, the techniques described herein relate to a system, wherein the boost mode state of the at least one component includes the at least one component running at a higher frequency than when in a steady state.

In some examples, the techniques described herein relate to a computing device including: one or more components; and a default boost controller to set each of the one or more components in a boost mode state, detect that at least one of the one or more components is power restricted or thermally restricted, and set, in response to detecting that the at least one component is power restricted or thermally restricted, the at least one component in a reduced power state.

In some examples, the techniques described herein relate to a computing device, the boost mode state including a higher power consumption setting than a steady state, the steady state being a maintainable state at which the at least one component is able to operate indefinitely without exceeding a power threshold or thermal threshold for the at least one component.

In some examples, the techniques described herein relate to a computing device, the one or more components including multiple components, the default boost controller being further to repeat the detecting and setting for each of the multiple components seriatim.

In some examples, the techniques described herein relate to a computing device, the default boost controller being further to: detect that the one or more components are able to return to the boost mode state, and return the one or more components to the boost mode state seriatim in a same order in which the one or more components were set to the reduced power state.

In some examples, the techniques described herein relate to a computing device, the one or more components including multiple components, the default boost controller being further to select the reduced power state for each of the multiple components to reduce power consumption of each of the multiple components proportionally.

In some examples, the techniques described herein relate to a computing device, the default boost controller being further to select, as the at least one component, from the one or more components in an order beginning with a component of the one or more components having a highest power saved with a lowest performance loss in the reduced power mode.

Figure 1:
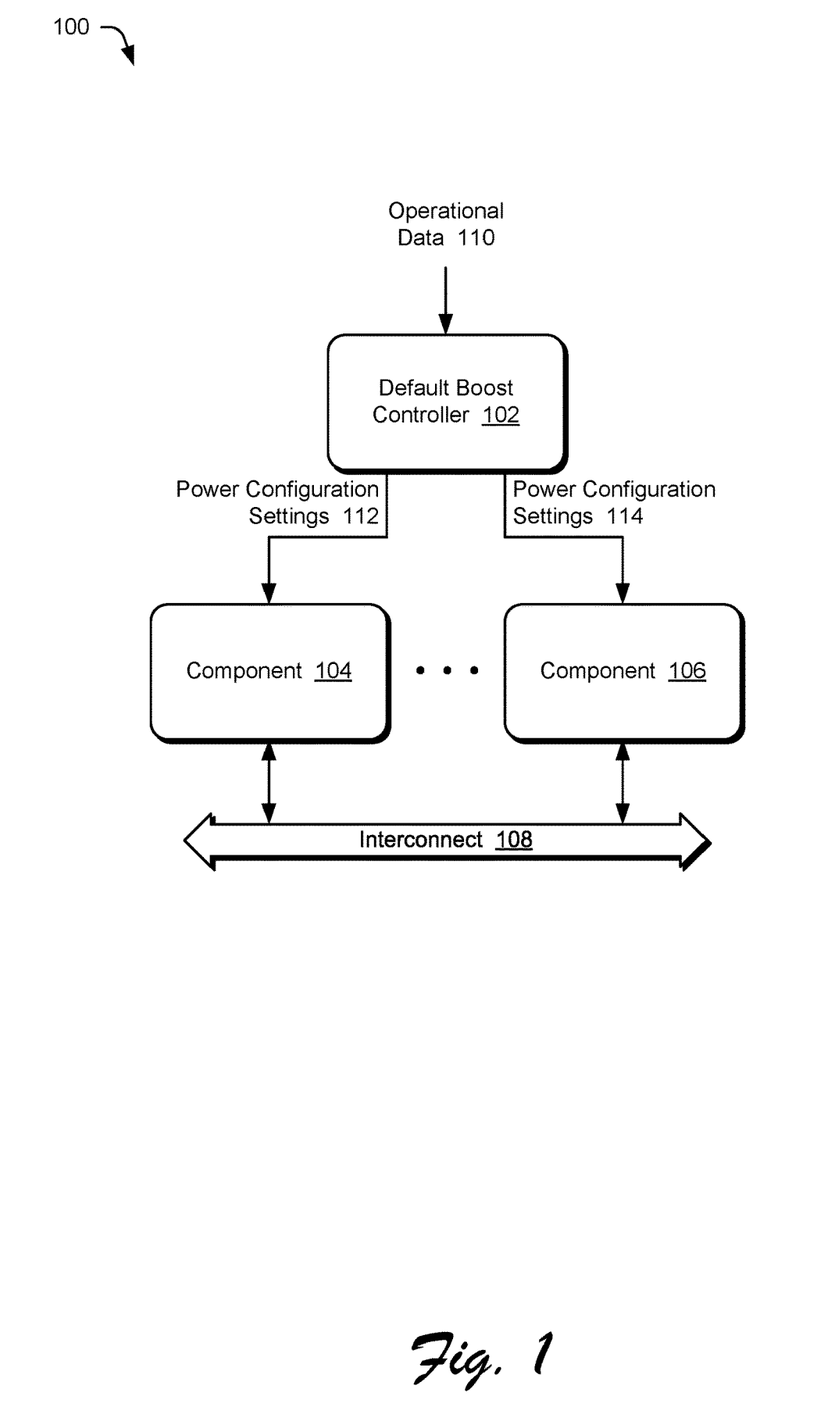
FIG. 1 is an illustration of a non-limiting example system that is operable to employ the default boost mode state for devices described herein.

FIG. 1 is an illustration of a non-limiting example system 100 that is operable to employ the default boost mode state for devices described herein. The system 100 includes a default boost controller 102 and any number of components, two of which are illustrated as components 104 and 106. The components 104 and 106 are any of a variety of different integrated circuits or portions thereof. In one or more implementations, the components 104 and 106 are a central processing unit (CPU) and a parallel accelerated processor (such as a graphics processing unit). Additionally or alternatively, the components 104 and 106 are a CPU and a cellular communication unit (e.g., receiving and sending radio waves, managing cellular connections, and so forth). Additionally or alternatively, the components 104 and 106 are separate chiplets in a single package (e.g., different silicon dies mounted onto a substrate layer). Additionally or alternatively, the components 104 and 106 are different intellectual property (IP) blocks, such as processor cores, graphics processing units, parallel accelerated processors, memory controllers, I/O controllers, face recognition chips, machine learning chips, and so forth on a single integrated circuit.

In one or more implementations, the default boost controller 102 is included as part of one or more of the components 104 and 106. Additionally or alternatively, the default boost controller 102 is implemented separately from the components 104 and 106, such as in a different IP block than the components 104 and 106, in a same package but on a different chiplet than the components 104 and 106, and so forth.

The components 104 and 106 communicate with one another via an interconnect 108. The interconnect 108 is any of a variety of wired or wireless communication mechanisms, such as a bus, a data fabric, and so forth.

The components 104 and 106 are able to operate in different power modes or states, including a steady state and a boost mode state. The steady state refers to a maintainable state at which the component is able to operate indefinitely without exceeding a power threshold or thermal threshold for the component. Exceeding such a power threshold or thermal threshold for a component has various consequences, such as physically damaging the component or causing the component to malfunction. A boost mode state, also referred to as simply boost mode, refers to a state that is maintainable for a finite duration of time before exceeding a power threshold or thermal threshold for the component.

In the boost mode state, performance of the component is increased relative to the steady state. This increased performance is obtained in any of various manners. In one or more implementations, the performance of a component is increased by increasing a frequency at which the component runs (e.g., a processor core, a memory controller, a data fabric such as the interconnect 108), and so forth. Increasing the frequency at which the component runs includes, for example, overclocking the component. Additionally or alternatively, the performance of a component is increased by increasing a number of channels that are active (e.g., having a larger number of memory channels than in the steady state). Additionally or alternatively, the performance of a component is increased by changing a routing algorithm used by or within the component (e.g., changing to a routing algorithm that is higher performance but consumes more power relative to a routing algorithm that is lower performance but consumes less power). Additionally or alternatively, the performance of a component is increased by reducing backpressure for network messages (e.g., at an I/O switch or network router), allowing more messages to be in a network at the same time but consuming more power relative to increased backpressure for network messages that allows fewer messages to be in the network at the same time but consumes less power.

The manner in which to increase the performance of a component is known and applied in any of a variety of different manners. In one or more implementations, the default boost controller 102 has knowledge of the different manners in which performance of a component is increased and provides an indication of the performance as a power configuration setting 112. For example, assume a processor core has a steady state frequency of 4 gigahertz (GHz) and a boost mode state frequency of 4.4 GHz. The default boost controller 102 has knowledge of these frequencies and provides an indication to the processor core to operate at one of these two frequencies as a power configuration setting. The knowledge of the different manners in which performance of a component is increased is known in any of a variety of different manners, such as provided by a designer or user of the component.

Additionally or alternatively, the default boost controller 102 need not have knowledge of the manners in which performance of a component is increased but is simply aware that it is possible to increase the performance of the component. In such situations, the default boost controller 102 provides an indication to the component to enter (or exit) boost mode state as a power configuration setting. Accordingly, the default boost controller 102 is able to control whether a component is in a steady state or a boost mode state without knowing the specific way in which performance of the component is increased.

The default boost controller 102 receives operational data 110 from any of various sources, such as power control circuitry, temperature monitoring circuitry, and so forth. In one or more implementations, the operational data 110 is received from power control or temperature monitoring circuitry implemented in the same package as the default boost controller 102 and the components 104 and 106. Additionally or alternatively, the operational data 110 is received from power control circuitry or temperature monitoring implemented separately from the package that implements the default boost controller 102 and the components 104 and 106. The operational data 110 provides an indication of how much power each of multiple different portions of the system 100 are consuming or a temperature at which each of multiple different portions of the system 100 are running. These portions are, for example, individual components, collections of multiple components (e.g., components sharing a common voltage rail).

The default boost controller 102 communicates power configuration settings 112 to the component 104 and power configuration settings 114 to the component 106. Although illustrated as separate from the interconnect 108, additionally or alternatively the power configurations settings 112 or 114 are communicated to the components 104 or 106 via the interconnect 108. The power configuration settings 112 indicate to component 104, and the power configuration settings 114 indicate to component 106, any of various settings for power configuration of the corresponding component 104 or 106, such as a frequency at which to run, a number of channels (e.g., communication channels) to activate, a routing algorithm to implement, an amount of back-pressure for network messages, and so forth. These various settings control an amount of power consumed or used by the components 104 and 106 and are provided by the default boost controller 102 based on operational data 110.

The default boost controller 102 puts the components 104 and 106 in a boost mode by default. Accordingly, any workloads run by the components 104 get the benefit of the boost mode, at least until the default boost controller 102 reduces their power usage as discussed in more detail below. In one or more implementations, the default boost controller 102 puts the components 104 and 106 in a boost mode state in response to the device including the system 100 being powered on or reset. Additionally or alternatively, the default boost controller 102 puts the components 104 and 106 in a boost mode state in response to another event being detected, such as a display or screen of the device including the system 100 being powered on, the device including the system 100 being removed from a pocket or flat surface (e.g., a tabletop), and so forth. These other events are detected by, and an indication of such provided to the system 100, any of a variety of sensors of the device including the system 100 using any of a variety of public or proprietary techniques.

The system 100 is implementable in any of a variety of different types of computing devices. For example, the system 100 is implementable in a smartphone or other wireless phone, a tablet or phablet computer, a notebook computer (e.g., netbook or ultrabook), a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television), an Internet of Things (IoT) device, an automotive computer, and so forth.

Figure 2:
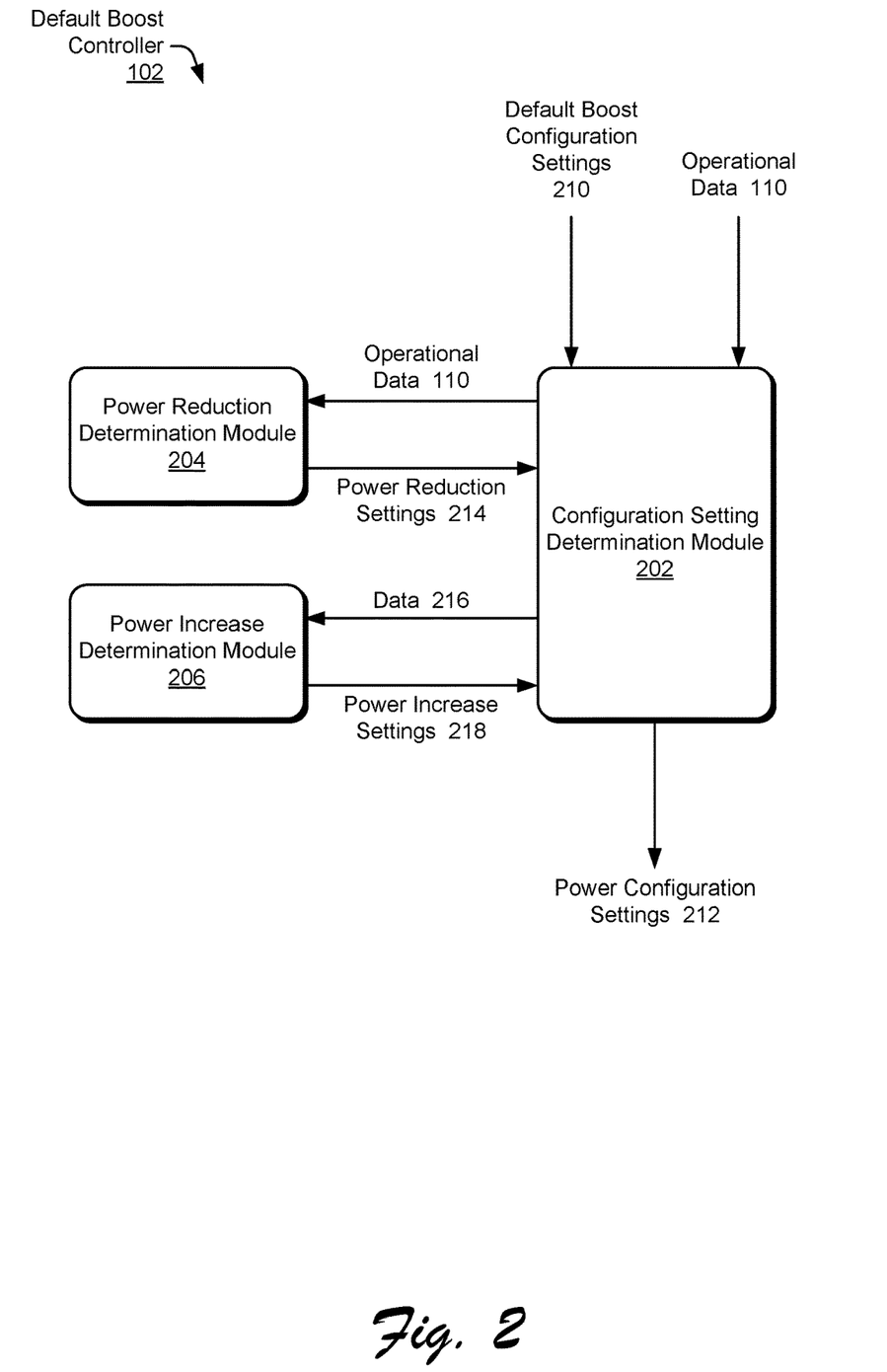
FIG. 2 illustrates an example architecture of a default boost controller.

FIG. 2 illustrates an example architecture of the default boost controller 102. The default boost controller 102 includes a configuration setting determination module 202, a power reduction determination module 204, and a power increase determination module 206. Generally, the configuration setting determination module 202 determines when the power consumed or used by one or more components is to be reduced, for example because the boost mode is no longer sustainable for one or more components due to power consumption or temperature. Situations in which boost mode is no longer sustainable for one or more components due to power consumption is also referred to as the one or more components being power restricted. Similarly, situations in which boost mode is no longer sustainable for one or more components due to temperature is also referred to as the one or more components being thermally restricted. The power reduction determination module 204 determines how to reduce power consumption in one or more components when the power consumed by one or more components is to be reduced, e.g., because the boost mode is no longer sustainable for one or more components due to power consumption or temperature.

Although examples are discussed herein of determining that the boost mode is no longer sustainable for one or more components due to power consumption or temperature, additionally or alternatively the configuration setting determination module 202 determines that power consumption is to be reduced in response to other events or conditions.

These events or conditions are detected by, and an indication of such provided to the system 100 of FIG. 1, any of a variety of sensors of the device including the system 100 using any of a variety of public or proprietary techniques.

In one or more implementations the configuration setting determination module 202 determines that power consumption is to be reduced in situations or environments in which high latency workloads are not expected. For example, the configuration setting determination module 202 determines that power consumption is to be reduced in response to a display or screen of the device including the system 100 being powered down, the device including the system 100 being placed in a pocket or purse, the device including the system 100 being placed in a low power mode (e.g., by a user input), and so forth. Additionally or alternatively, the configuration setting determination module 202 determines that power consumption is to be reduced in response to other events or conditions, such as user input activating a lock screen of the device including the system 100, a low battery charge indication being received for the device including the system 100, an indication that a user is not in close proximity to the device including the system 100 (e.g., a watch or other wearable device is not detected within range of the device including the system 100), and so forth.

The configuration setting determination module 202 also determines when the power consumed by one or more components is to be increased because events or conditions indicate that power consumed by one or more components is no longer to be reduced, e.g., power consumption or temperature no longer prevent the boost mode from being sustainable (e.g., the one or more components are no longer power restricted or thermally restricted). The power increase determination module 206 determines how to increase power consumption in one or more components when the power consumed by one or more components is to be increased, e.g., because power consumption or temperature no longer prevent the boost mode from being sustainable.

More specifically, the configuration setting determination module 202 receives default boost configuration settings 210. The default boost configuration settings 210 are the boost mode state settings for one or more components. These boost mode state settings are any of a variety of different settings, such as a boost mode frequency for each of one or more components, a number of active channels for one or more components, a routing algorithm for one or more components to use, an amount of backpressure for network messages for one or more components, and so forth as discussed above. As the default settings for the one or more components are boost mode state settings, the configuration setting determination module 202 provides the default boost configuration settings 210 to the appropriate ones of the components as power configuration settings 212. In one or more implementations, the configuration setting determination module 202 provides the default boost configuration settings 210 to the various components as part of a startup or boot process for a device including the default boost controller 102. For example, the configuration setting determination module 202 provides the default boost configuration settings 210 to the various components in response to detecting that a device including the default boost controller 102 has been booted, that a device including the default boost controller 102 has exited a sleep or hibernate mode, and so forth.

During operation, the configuration setting determination module 202 receives operational data 110 indicating how much power each of multiple different portions of the system 100 is consuming or a temperature of each of multiple different portions of the system 100. These different portions are, for example, individual components, collections of multiple components (e.g., components sharing a common voltage rail), and so forth as discussed above.

Figure 3:
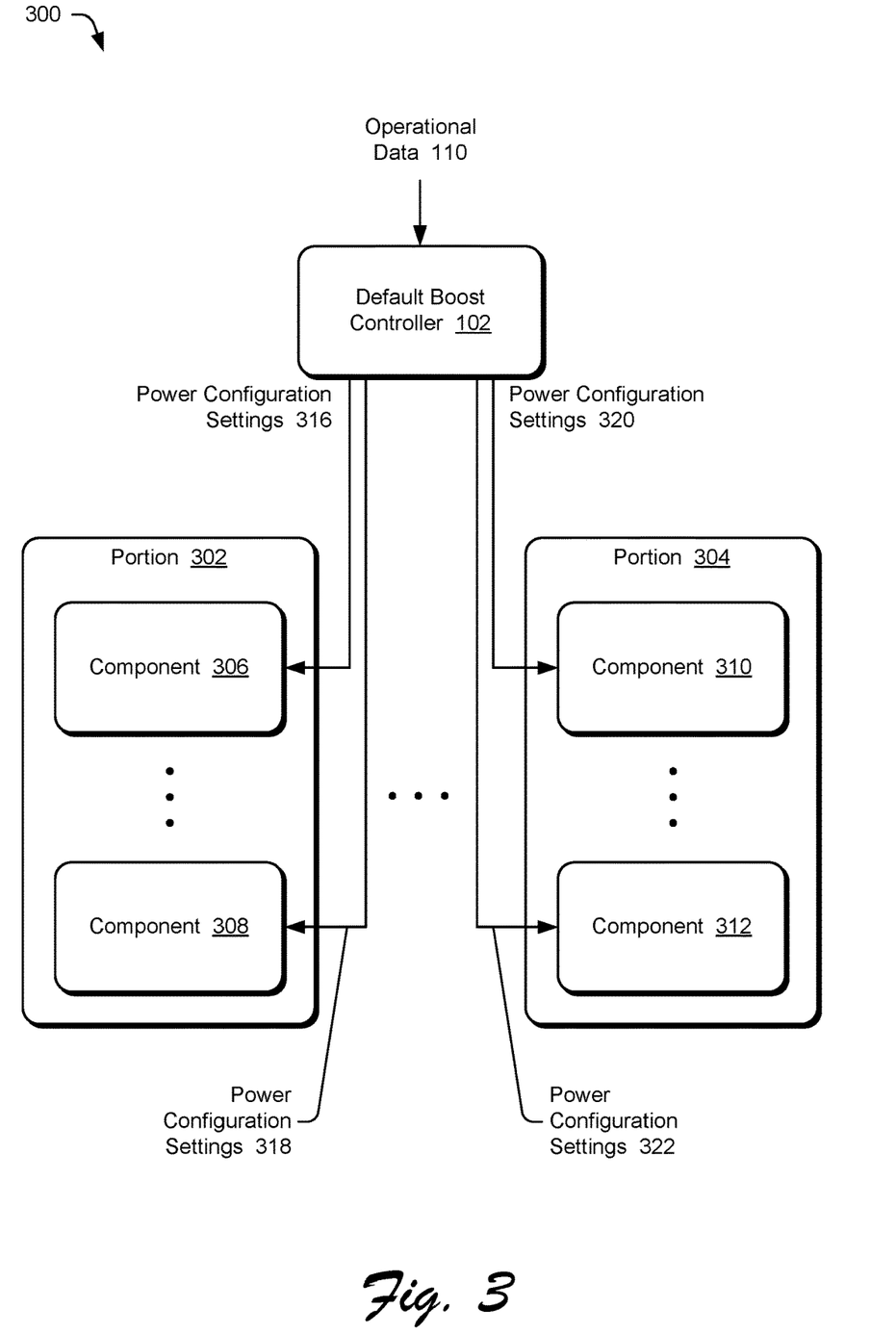
FIG. 3 illustrates an example system including a default boost controller and multiple portions.

FIG. 3 illustrates an example system 300 including the default boost controller 102, a portion 302, and a portion 304. Although two portions 302 and 304 are illustrated, the system 300 includes any number of portions. Portion 302 includes any number of components, two of which are illustrated as components 306 and 308. Similarly, portion 304 includes any number of components, two of which are illustrated as components 310 and 312. The components 104 and 106 of FIG. 1 are, for example, the components 306 and 308 of portion 302 or the components 310 and 312 of portion 304.

The default boost controller 102 provides different power configuration settings to each of the components. These power configuration settings are illustrated as power configuration settings 316 for component 306, power configuration settings 318 for component 308, power configuration settings 320 for component 310, and power configuration settings 322 for component 312. Accordingly, the default boost controller 102 is able to change the power configuration settings of the components individually.

Returning to FIG. 2, the configuration setting determination module 202 analyzes the operational data 110 and determines when the power consumption by one or more components is to be reduced, e.g., because the boost mode state is no longer sustainable for one or more components due to power consumption or temperature. The operational data 110 is received or analyzed at regular or irregular intervals, and in one or more implementations the operational data 110 is received frequently enough that the power consumed by the components is reduced prior to any damage being done to the components due to power consumption or temperature. For example, the operational data 110 is received or analyzed approximately every 1 millisecond.

In one or more implementations, the operational data 110 is power consumption data, such as from any of various power control circuitry discussed above. The configuration setting determination module 202 uses any of a variety of different rules, criteria, or systems (e.g., machine learning systems) to determine when the one or more components are power restricted. In one or more implementations, the configuration setting determination module 202 uses a power threshold setting. If the power consumed by a portion of the system 100 exceeds a threshold amount for a threshold duration, the configuration setting determination module 202 determines that the power consumed by one or more components in that portion of the system 100 is to be reduced because the one or more components are power restricted. This threshold amount and threshold duration are set in any of various manners, such as by a developer or manufacturer of components in the portion, by a developer or manufacturer of the system or device including the portion, and so forth.

For example, if a portion of the system that is a processor is able to run in the steady state at 500 watts but at more than 600 watts the processor generates too much heat and will be physically damaged, the threshold amount is set to be an amount below 600 watts, such as 580 watts. The threshold duration is optionally short, such as 1 millisecond, so that the configuration setting determination module 202 determines that the power consumed by one or more components in that portion of the system 100 is to be reduced as soon as the threshold amount is exceeded. Additionally or alternatively, the threshold duration is set to a longer period, such as 10 milliseconds or 50 milliseconds, so that the configuration setting determination module 202 does not determine that the power consumed by one or more components in that portion of the system 100 is to be reduced if the threshold amount is exceeded by only a short amount of time (e.g., less than 10 milliseconds or 50 milliseconds).

Additionally or alternatively, the configuration setting determination module 202 uses rules or criteria other than a power threshold setting. For example, in one or more implementations the configuration setting determination module 202 includes a model or algorithm that identifies, based on power consumption over a duration of time, that boost mode state for the portion of the system is expected to no longer be sustainable in a particular amount of time (e.g., within 10 milliseconds or 50 milliseconds). Such a model or algorithm is optionally a machine learning system trained, based on operation of the portion of the system over time, to identify when boost mode state for the portion is expected to no longer be sustainable in a particular amount of time.

In one or more implementations, the operational data 110 is temperature data, such as from any of various temperature monitoring circuitry discussed above. The configuration setting determination module 202 uses any of a variety of different rules, criteria, or systems (e.g., machine learning systems) to determine when the one or more components are thermally restricted. In one or more implementations, the configuration setting determination module 202 uses a temperature threshold setting. If the temperature of a portion of the system 100 exceeds a threshold amount for a threshold duration, the configuration setting determination module 202 determines that the power consumed by one or more components in that portion of the system 100 is to be reduced because the one or more components are thermally restricted. This threshold amount and threshold duration are set in any of various manners, such as by a developer or manufacturer of components in the portion, by a developer or manufacturer of the system or device including the portion, and so forth.

For example, if a portion of the system that is a processor is able to run in the steady state at 90 degrees Celsius but at more than 100 degrees Celsius the processor will be physically damaged, the threshold amount is set to be an amount below 100 degrees Celsius, such as 95 degrees Celsius. The threshold duration is optionally short, such as 1 millisecond, so that the configuration setting determination module 202 determines that the power consumed by one or more components in that portion of the system 100 is to be reduced as soon as the threshold amount is exceeded. Additionally or alternatively, the threshold duration is set to a longer period, such as 10 milliseconds or 50 milliseconds, so that the configuration setting determination module 202 does not determine that the power consumed by one or more components in that portion of the system 100 is to be reduced if the threshold amount is exceeded by only a short amount of time (e.g., less than 10 milliseconds or 50 milliseconds).

Additionally or alternatively, the configuration setting determination module 202 uses rules or criteria other than a temperature threshold setting. For example, in one or more implementations the configuration setting determination module 202 includes a model or algorithm that identifies, based on temperature of the portion of the system over a duration of time, that boost mode state for the portion of the system is expected to no longer be sustainable in a particular amount of time (e.g., within 10 milliseconds or 50 milliseconds). Such a model or algorithm is optionally a machine learning system trained, based on operation of the portion of the system over time, to identify when boost mode state for the portion is expected to no longer be sustainable in a particular amount of time.

In response to determining that the power consumed by one or more components is to be reduced because the one or more components are power restricted or thermally restricted, the configuration setting determination module 202 provides the operational data 110 to the power reduction determination module 204. The operational data 110 provided to the power reduction determination module 204 identifies the power consumption or temperature for one or more portions of the system 100 that resulted in the configuration setting determination module 202 determining that the boost mode state is no longer sustainable. The power reduction determination module 204 determines how to reduce power consumption in one or more components of each of the one or more portions so that the components in the portion are not physically damaged and do not malfunction due to the power consumption or temperature of the components in the portion.

The power consumption of a component is reduced in any of variety of manners. In one or more implementations, the power consumption of a component is reduced by reducing a frequency at which the component runs (e.g., a processor core, a memory controller, a data fabric such as the interconnect 108), and so forth. Additionally or alternatively, the power consumption of a component is reduced by reducing a number of channels that are active (e.g., a number of memory channels). Additionally or alternatively, the power consumption of a component is reduced by changing a routing algorithm used by or within the component (e.g., changing to a routing algorithm that is lower performance but consumes less power relative to a routing algorithm that is higher performance but also consumes more power). Additionally or alternatively, the power consumption of a component is increased by increasing backpressure for network messages (e.g., at an I/O switch or network router), allowing fewer messages to be in a network at the same time and consuming less power relative to decreased backpressure for network messages that allows more messages to be in the network at the same time but consumes more power.

In one or more implementations, the power reduction determination module 204 selects components in the portion seriatim. The power reduction determination module 204 uses any of a variety of different rules or criteria to determine the order in which components have their power reduced seriatim. These rules or criteria are set in any of a variety of manners, such as by a system developer or designer, by a user of the device including the default boost controller 102, and so forth. Additionally or alternatively, the power reduction determination module 204 uses various other systems, such as a machine learning system, to determine an order in which components are to have their power consumption reduced. As an example, power reduction determination module 204 includes a machine learning system trained to determine which an order in which components are to have their power consumption reduced based on any of various criteria, such as the operational data 110, data regarding workloads running on the device, and so forth.

When selecting components seriatim, the power reduction determination module 204 selects components in the determined order until the configuration setting determination module 202 determines that power consumption no longer is to be reduced. An example of such an ordering is reducing a number of channels that are active in a memory controller first, reducing a frequency at which a processor core runs second, and reducing a frequency at which a data fabric runs third. For each selected component, the power reduction determination module 204 provides an indication of that component to the configuration setting determination module 202 in power reduction settings 214. The ordering is set, for example, in an order of highest power saved with lowest performance loss component to lowest power saved with highest performance loss component.

The power reduction determination module 204 also determines how to reduce power consumption for the selected component and includes an indication of how to reduce power consumption for the component in the power reduction settings 214. The power reduction determination module 204 determines how to reduce the power consumption of the component by applying any of a variety of rules, criteria, or systems (e.g., a machine learning system). In one or more implementations, the power reduction determination module 204 determines to set the component in a reduced power state in which the component is able to run in the steady state. E.g., the power reduction determination module 204 determines to run the component at a highest frequency at which the component remains in its steady state.

Additionally or alternatively, the power reduction determination module 204 determines how to reduce the power consumption of the component based on the operational data 110. This allows the power reduction determination module 204 to keep the component in a boosted mode state although not a highest boosted mode state. For example, if the operational data 110 indicates that the temperature of the component (or the portion that includes the component) is 2 degrees Celsius above the temperature at which the component is able to run in the steady state of the component, then the power reduction determination module 204 determines to reduce the power consumption of the component to be halfway between the current setting for the component and a steady state setting for the component. E.g., if the steady state frequency of the component is 4.0 GHz and a highest boost mode state frequency for the component is 4.4 GHz, the power reduction determination module 204 determines to reduce the power consumption of the component by setting the frequency for the component to 4.2 GHz. This allows the component to continue running for a little while longer at a boost mode state of 4.2 GHz, and depending on the situation possibly allows the component to maintain running at 4.2 GHz for a period of time (e.g., 1 or 2 seconds) before the power reduction determination module 204 determines to reduce the power consumption of the component by setting the component to run at the steady state frequency of 4.0 GHz.

Additionally or alternatively, the power reduction determination module 204 determines to reduce the power consumption for multiple components in the portion approximately simultaneously. In one or more implementations, the power reduction determination module 204 selects all of the components in the portion (e.g., all of the components in the portion that have a boost mode) as the multiple components. Additionally or alternatively, the power reduction determination module 204 selects a subset of the components in the portion using any of a variety of different rules, criteria, or system. Such rules or criteria are set in any of a variety of manners, such as by a system developer or designer, by a user of the device including the default boost controller 102, and so forth. Such a system is, for example, a machine learning system trained to select components based on any of various criteria, such as the operational data 110, data regarding workloads running on the device, characteristics of the components as provided by a system developer or designer, and so forth.

The power reduction determination module 204 also determines how to reduce power consumption for the selected components and includes an indication of how to reduce power consumption for the selected components in the power reduction settings 214. The power reduction determination module 204 determines how to reduce the power consumption of the selected components by applying any of a variety of rules, criteria, or systems (e.g., a machine learning system). In one or more implementations, the power reduction determination module 204 determines to set each of the selected components in a reduced power state in which the component is able to run in the steady state. E.g., the power reduction determination module 204 determines to run each of the selected components at a highest frequency at which the component remains in its steady state.

Additionally or alternatively, the power reduction determination module 204 determines how to reduce the power consumption of the selected components proportionally. As an example, assume there are three selected components then the power reduction determination module 204 estimates how much power consumption in the portion is attributable to each of the three selected components and reduces the power consumption by each component by an amount proportional to power consumption by that component. E.g., assume the portion is able to run in the steady state at 500 watts but is currently running at 600 watts, that component A is estimated to consume 30% of the power of the portion, component B is estimated to consume 20% of the power of the portion, and component C is estimated to consume 50% of the power of the portion. In this example, power consumption of the portion is reduced by 100 watts by reducing the power consumption of component A by 30 watts, the power consumption of component B by 20 watts, and the power consumption component C by 50 watts.

The manner in which the power consumption of a particular component is reduced by a given percentage various based on the component and how increased performance of the component is obtained in a boost mode state. The power reduction determination module 204 is aware of how changes to a component (e.g., frequency, number of active channels, etc.) change the power consumption of the component. This information is provided, for example, by a system designer or developer, by known algorithms or models, and so forth. Given this information, the power reduction determination module 204 readily determines how to reduce power consumption for each of various components by a desired amount.

Additionally or alternatively, the power reduction determination module 204 determines how to reduce the power consumption of the selected components based on the operational data 110. This allows the power reduction determination module 204 to keep the selected components in a boosted mode state although not a highest boosted mode state. For example, if the operational data 110 indicates that the power consumption of the portion that includes the selected components is 100 watts above the power consumption at which the selected components are able to run in their steady states, then the power reduction determination module 204 determines to reduce the power consumption of the selected components by 50 watts, even if that keeps the selected components at settings higher than their steady state settings for the component. This allows situations to occur in which one or more of the selected components continue running for a little while longer in a boost mode state, and depending on the situation possibly allows one or more of the selected components to maintain running in a boost mode state for a period of time (e.g., 1 or 2 seconds) before the power reduction determination module 204 determines to reduce the power consumption of the component by setting the selected components at their steady states.

The configuration setting determination module 202 receives the power reduction settings 214 and communicates power configuration settings 212 to the one or more components indicated in the power reduction settings 214. The configuration setting determination module 202 also includes in the power configuration settings 212 for each component an indication of how to reduce power consumption of that component. This indication of how to reduce power consumption takes any of various forms as discussed above, such as a frequency setting, a number of active channels setting, a routing algorithm setting, an indication to exit boost mode state (e.g., and return to a steady state mode), and so forth. Each component, in response to receiving a power configuration setting 212, changes its operation based on the indication of how to reduce power consumption in that component.

The configuration setting determination module 202 also maintains a record of which components have had their power consumption reduced, optionally including an amount by which their power consumption was reduced and an order in which they had their power consumption reduced. In one or more implementations the configuration setting determination module 202 provides this information to the power increase determination module 206 for use in determining which components to return to their boost mode state as discussed in more detail below.

After providing power configuration settings 212 to one or more components, the configuration setting determination module 202 continues to receive and analyze operational data 110 to determine when the one or more components are able to return to a boost mode state. In one or more implementations, the configuration setting determination module 202 analyzes the operational data 110 at the same rate as is used in determining when the power consumption by one or more components is to be reduced, e.g., because the boost mode state is no longer sustainable for one or more components due to power consumption or temperature (e.g., approximately every 1 millisecond). Additionally or alternatively, the configuration setting determination module 202 analyzes the operational data 110 at a different rate, such as every 5 milliseconds or every 0.5 milliseconds.

In one or more implementations, the operational data 110 is power consumption data, such as from any of various power control circuitry discussed above. The configuration setting determination module 202 uses any of a variety of different rules, criteria, or systems (e.g., machine learning systems) to determine when the one or more components are able to return to a boost mode state. In one or more implementations, the configuration setting determination module 202 uses a power threshold setting. If the power consumed by a portion of the system 100 falls below a threshold amount for a threshold duration, the configuration setting determination module 202 determines that the one or more components in that portion of the system 100 are able to return to a boost mode state because the one or more components are no longer power restricted. This threshold amount and threshold duration are set in any of various manners, such as by a developer or manufacturer of components in the portion, by a developer or manufacturer of the system or device including the portion, and so forth.

In one or more implementations, this threshold amount is set at various levels, such as a level at which the one or more components are in a steady state. Additionally or alternatively, this threshold amount is set at a level less than the level at which the one or more components are in a steady state to avoid situations where the one or more components are repeatedly switching in and out of a boost mode state over a short amount of time.

For example, if a portion of the system that is a processor is able to run in the steady state at 500 watts, the threshold amount is set to be 500 watts or an amount below 500 watts, such as 480 watts. The threshold duration is optionally short, such as 1 millisecond, so that the configuration setting determination module 202 determines that the one or more components are to return to a boost mode state as soon as the threshold amount is satisfied (e.g., power consumption drops below 480 watts). Additionally or alternatively, the threshold duration is set to a longer period, such as 10 milliseconds or 50 milliseconds, to avoid situations where the one or more components are repeatedly switching in and out of a boost mode state over a short amount of time.

Additionally or alternatively, the configuration setting determination module 202 uses rules or criteria other than a power threshold setting to determine when the one or more components are able to return to boost mode. In one or more implementations, the configuration setting determination module 202 includes a model or algorithm that identifies, based on power consumption over a duration of time, that boost mode for the portion of the system is expected to be sustainable. Such a model or algorithm is optionally a machine learning system trained, based on operation of the portion of the system over time, to identify when a boost mode state for the portion is expected to be sustainable.

In one or more implementations, the operational data 110 is temperature data, such as from any of various temperature monitoring circuitry discussed above. The configuration setting determination module 202 uses any of a variety of different rules, criteria, or systems (e.g., machine learning systems) to determine when the one or more components are able to return to a boost mode state. In one or more implementations, the configuration setting determination module 202 uses a temperature threshold setting. If the temperature of a portion of the system 100 falls below a threshold amount for a threshold duration, the configuration setting determination module 202 determines that the one or more components in that portion of the system 100 are able to return to a boost mode state because the one or more components are no longer thermally restricted. This threshold amount and threshold duration are set in any of various manners, such as by a developer or manufacturer of components in the portion, by a developer or manufacturer of the system or device including the portion, and so forth.

In one or more implementations, this threshold amount is set at various levels, such as a level at which the one or more components are in a steady state. Additionally or alternatively, this threshold amount is set at a level less than the level at which the one or more components are in a steady state to avoid situations where the one or more components are repeatedly switching in and out of a boost mode state over a short amount of time.

For example, if a portion of the system that is a processor is able to run in the steady state at 90 degrees Celsius, the threshold amount is set to be 90 degrees Celsius or an amount below 90 degrees Celsius, such as 88 degrees Celsius. The threshold duration is optionally short, such as 1 millisecond, so that the configuration setting determination module 202 determines that the one or more components are to return to a boost mode state as soon as the threshold amount is satisfied (e.g., temperature drops below 88 degrees Celsius). Additionally or alternatively, the threshold duration is set to a longer period, such as 10 milliseconds or 50 milliseconds, to avoid situations where the one or more components are repeatedly switching in and out of a boost mode state over a short amount of time.

Additionally or alternatively, the configuration setting determination module 202 uses rules or criteria other than a temperature threshold setting to determine when the one or more components are able to return to boost mode. In one or more implementations, the configuration setting determination module 202 includes a model or algorithm that identifies, based on temperature of the portion of the system over a duration of time, that a boost mode state for the portion of the system is expected to be sustainable. Such a model or algorithm is optionally a machine learning system trained, based on operation of the portion of the system over time, to identify when a boost mode state for the portion is expected to be sustainable.

Additionally or alternatively, the configuration setting determination module 202 determines when the one or more components are able to return to boost mode in response to other events or conditions. These events or conditions are detected by, and an indication of such provided to the system 100 of FIG. 1, any of a variety of sensors of the device including the system 100 using any of a variety of public or proprietary techniques. In one or more implementations, the configuration setting determination module 202 determines that one or more components are able to return to boost mode in response to the events or conditions that resulted in determining that power consumption was to be reduced no longer existing. For example, the configuration setting determination module 202 determines that one or more components are able to return to boost mode in response to the device including the system 100 of FIG. 1 being removed from a pocket or purse, the device including the system 100 no longer being in a low power mode, an indication that a user is in close proximity to the device including the system 100, and so forth.

In response to determining that the one or more components are able to be returned to a boost mode state, the configuration setting determination module 202 provides data 216 to the power increase determination module 206. In one or more implementations, the data 216 includes the operational data 110. Additionally or alternatively, the data 216 includes an indication of which components had their power consumption reduced, how those components had their power consumption reduced, an order in which components had their power consumption reduced, and so forth. The power increase determination module 206 uses the data 216 to determine how to return the one or more components that previously had their power consumption reduced by the configuration setting determination module 202 to their boost mode state. For each component that is to be returned to its boost mode state, the power increase determination module 206 provides an indication of that component to the configuration setting determination module 202 in power increase settings 218.

In one or more implementations, the power increase determination module 206 determines to return the one or more components to their boost mode state (e.g., their default boost configuration settings 210) in the same order as power consumption was reduced (e.g., the first component to have its power consumption reduced is the first component returned to boost mode state).

For example, assume power consumption was reduced in components seriatim in an order of reducing a number of channels that are active in a memory controller first, reducing a frequency at which a processor core runs second, and reducing a frequency at which a data fabric runs third. In this example, the one or more components are returned to their boost mode states in the following order: increasing the number of channels that are active in the memory controller first, increasing the frequency at which the processor core runs second, and increasing the frequency at which the data fabric runs third.

When returning components to their boost mode state seriatim, the power increase determination module 206 selects components in order for as long as the configuration setting determination module 202 determines that one or more components are able to return to a boost mode state. E.g., continuing with the previous example, the power increase determination module 206 first indicates to the configuration setting determination module 202 to increase the number of channels that are active in the memory controller. The configuration setting determination module 202 determines whether one or more components are still able to return to a boost mode state. If one or more components are no longer able to return to boost mode, the configuration setting determination module 202 does not return any more components to a boost mode state at this time. However, if one or more components are able to return to a boost mode state, the configuration setting determination module 202 provides data 216 to the power increase determination module 206, which indicates to the configuration setting determination module 202 to increase the frequency at which the processor core runs.

In one or more implementations, the power increase determination module 206 also determines how to increase power consumption for a component and includes an indication of how to increase power consumption for the component in the power increase settings 218. The power increase determination module 206 determines how to increase the power consumption of the component by applying any of a variety of rules, criteria, or systems (e.g., a machine learning system). In one or more implementations, the power reduction determination module 204 determines to set the component in the default boost mode state for the component (e.g., as indicated by the default boost configuration settings 210).

Additionally or alternatively, the power increase determination module 206 determines how to increase the power of the component based on the operational data 110. This allows the power increase determination module 206 to return the component to a boosted mode state although not a highest boosted mode state. For example, if the operational data 110 indicates that the temperature of the component (or the portion that includes the component) is 2 degrees Celsius below the temperature at which the component is able to run in the steady state of the component, then the power increase determination module 206 determines to increase the power consumption of the component to be halfway between the current setting for the component and a highest boost mode setting for the component. E.g., if the steady state frequency of the component is 4.0 GHz and the current setting for the component is 4.0 GHz, and a highest boost mode frequency for the component is 4.4 GHz, the power increase determination module 206 determines to increase the power consumption of the component by setting the frequency for the component to 4.2 GHz. This allows the component to return to running in a boost mode state of 4.2 GHz but not the highest boost mode state of 4.4 GHz. As another example, if the steady state frequency of the component is 4.0 GHz, the current setting for the component is 4.2 GHz, and a highest boost mode frequency for the component is 4.4 GHz, the power increase determination module 206 determines to increase the power consumption of the component by setting the frequency for the component to 4.4 GHz. This allows the component to return to running in the highest boost mode of 4.4 GHz.

In one or more implementations, the power reduction determination module 204 determines to reduce the power consumption for multiple components in the portion approximately simultaneously as discussed above. In such implementations, the power increase determination module 206 determines to increase the power consumption of the multiple components in the same manner and order in which the multiple components had their power consumption reduced. For example, assume the multiple components include component A, component B, and component C, and that the power reduction determination module 204 determined to decrease the number of active memory channels for component A by 2, reduce the frequency of component B by 0.4 GHz, and reduce the frequency of component C by 0.2 GHz. In this example, the power increase determination module 206 determines to increase the number of active memory channels for component A by 2, increase the frequency of component B by 0.4 GHz, and increase the frequency of component C by 0.2 GHz The configuration setting determination module 202 receives the power increase settings 218 and communicates power configuration settings 212 to the one or more components indicated in the power increase settings 218. The configuration setting determination module 202 also includes in the power configuration settings 212 for each component an indication of how to increase power in that component. This indication of how to increase power takes any of various forms as discussed above, such as a frequency setting, a number of active channels setting, a routing algorithm setting, an indication to enter or return to a default boost mode state, and so forth. Each component, in response to receiving a power configuration setting 212, changes its operation based on the indication of how to increase power in that component.

Additionally or alternatively, in one or more implementations the operational data 110 includes data describing one or more workloads being executed or otherwise performed by the components 104 and 106. The configuration setting determination module 202 (or the power reduction determination module 204) analyzes the one or more workloads and determines configuration settings that are preferred or desired by the one or more workloads. Any of a variety of different rules, criteria, or systems (e.g., machine learning systems) are used to determine the configuration settings that are preferred or desired by the one or more workloads. By way of example, data transfers among components are monitored, including source components of data, recipient components of data, amounts of data transferred, and so forth. Components receiving or sending smaller amounts of data are set to run in a reduced power state whereas components receiving or sending larger amounts of data remain in the boost mode state. By way of another example, data provided by the workloads themselves (e.g., metadata associated with the workloads) specifying preferred or desired settings for different components are identified. The components are then set in a reduced power state or remain in the boost mode state in accordance with those specified settings. By way of another example, a determination is made as to which component is performing more computations (e.g., a CPU or a GPU). Components performing fewer computations are set to run in a reduced power state whereas components performing more computations remain in the boost mode state.

In response to determining the configuration settings that are preferred or desired by the one or more workloads, the configuration setting determination module 202 provides power configuration settings 212 to the appropriate components in accordance with the configuration settings that are preferred or desired by the one or more workloads. The configuration setting determination module 202 (or the power increase determination module 206) determines, based on the operational data 110, when the one or more workloads are no longer being run. In response to the one or more workloads no longer being run, the configuration setting determination module 202 provides power configuration settings 212 to the appropriate components to return the components to their boost mode states (or whatever states the components were in prior to the configuration setting determination module 202 providing the configuration settings that were preferred or desired by the one or more workloads to the components).

For example, assume a CPU and a GPU are both set by default in the boost mode state. Analysis of one or more workloads indicates that the preferred or desired configuration settings for the one or more workloads is for the CPU to run in a reduced power state (e.g., at a lower frequency, such as a steady frequency) but the GPU to run in the boost mode state. Accordingly, the configuration setting determination module 202 provides power configuration settings 212 to the CPU indicating for the CPU to run in the reduced power state. In response to determining that the one or more workloads no longer being run, the configuration setting determination module 202 provides power configuration settings 212 to the CPU to run in its boost mode state.

Figure 4:
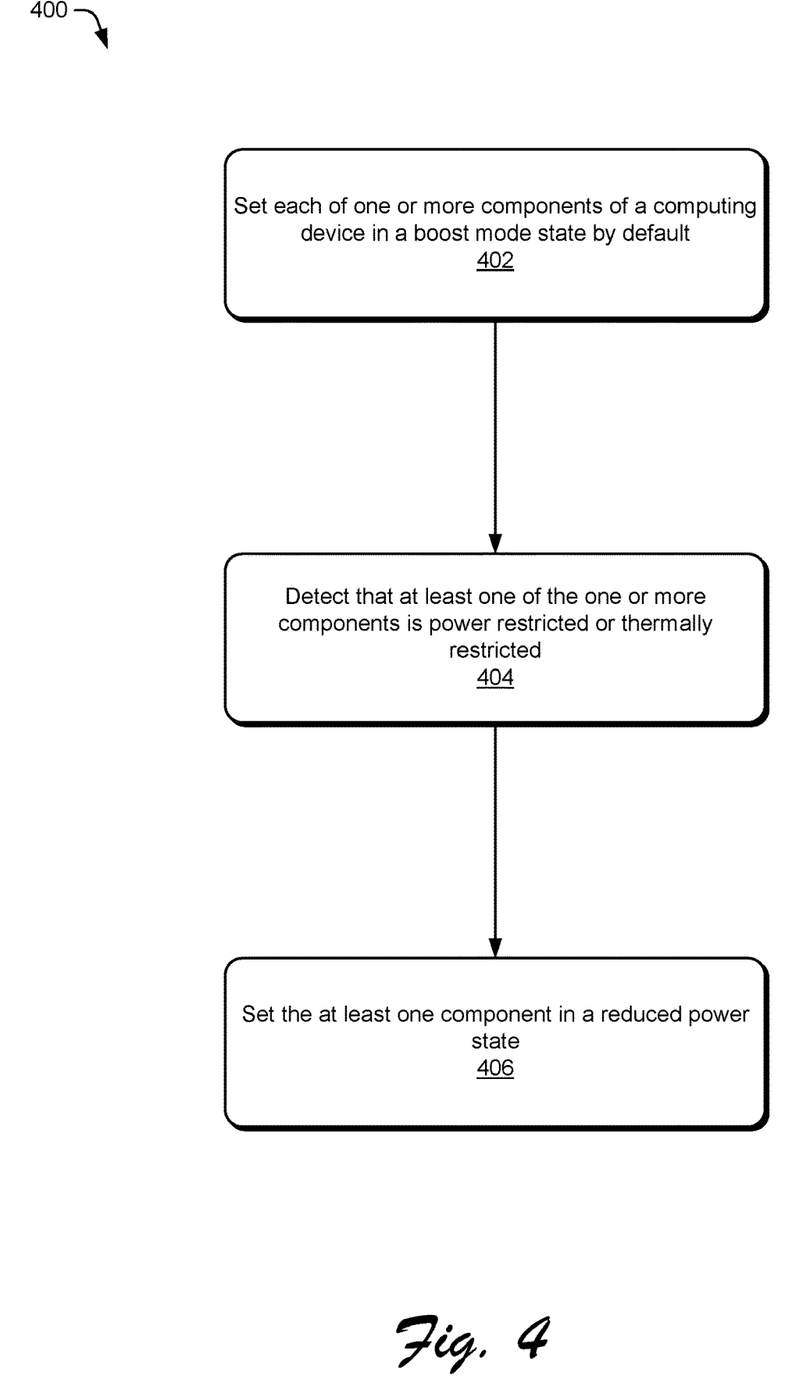
FIG. 4 is a flow diagram depicting a procedure in an example implementation of default boost mode state for devices.

FIG. 4 is a flow diagram 400 depicting a procedure in an example implementation of default boost mode state for devices. The flow diagram 400 is performed by a default boost controller such as default boost controller 102 of FIG. 1, FIG. 2, or FIG. 3.

In this example, each of one or more components of a computing device are set by default in a boost mode state (block 402). The one or more components are proactively set in the boost mode state, increasing the performance of the one or more components relative to their steady states.

At least one of the one or more components is detected as being power restricted or thermally restricted (block 404).

In response to detecting that the at least one component is power restricted or thermally restricted, the at least one component is set to a reduced power state (block 406). In the reduced power state the performance of the at least one component is reduced relative to the boost mode setting, but the power consumed or the temperature of the components is reduced.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the default boost controller 102, the components 104, the components 106, the configuration setting determination module 202, the power reduction determination module 204, the power increase determination module 206, the components 306, the components 308, the components 310, and the components 312) are implemented in any of a variety of different manners such as hardware circuitry, software executing or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
setting, by a boost controller circuit, based on a computing device being powered on, each of one or more components of the computing device in a boost mode state;
detecting, by the boost controller circuit, that at least one component of the one or more components is power restricted or thermally restricted;
setting, by the boost controller circuit, in response to detecting that the at least one component is power restricted or thermally restricted, the at least one component in a reduced power state;
maintaining, by the boost controller circuit, a record of at least one of an order in which the one or more components are set to the reduced power state or an amount by which power consumption of each of the one or more components was reduced; and
returning, based at least in part on the record, the one or more components to the boost mode state.

2. The method of claim 1, the boost mode state including a higher power consumption setting than a steady state, the steady state being a maintainable state at which the at least one component is able to operate indefinitely without exceeding a power threshold or thermal threshold for the at least one component.

3. The method of claim 1, the one or more components including multiple components, the method further comprising repeating the detecting and setting for each of the multiple components.

4. The method of claim 1, the method further comprising:
detecting that the one or more components are able to return to the boost mode state, and
wherein the returning, based at least in part on the record, the one or more components to the boost mode state includes returning the one or more components to the boost mode state in the order in which the one or more components were set to the reduced power state, and increasing the power consumption of each of the one or more components by the amount by which the power consumption of the one or more components was reduced.

5. The method of claim 1, the one or more components including multiple components, the method further including selecting the reduced power state for each of the multiple components to reduce power consumption of each of the multiple components proportionally.

6. The method of claim 1, further comprising selecting, as the at least one component, from the one or more components in an order beginning with a component of the one or more components having a highest power saved with a lowest performance loss in the reduced power state.

7. The method of claim 1, entering the boost mode state in response to receiving an indication that a screen or display of the computing device is powered on.

8. The method of claim 1, wherein the boost mode state of the at least one component includes the at least one component running at a higher frequency than when in a steady state.

9. The method of claim 1, wherein the boost mode state of the at least one component includes the at least one component having a larger number of active channels than when in a steady state.

10. The method of claim 1, wherein the boost mode state of the at least one component includes using a routing algorithm of the at least one component having a higher performance and using more power than a routing algorithm used in a steady state.

11. The method of claim 1, further comprising configuring each of the one or more components with a boost mode state setting as part of a boot process for the computing device.

12. A system comprising:
a power reduction controller circuit to generate and communicate a first indication of how to reduce power consumption of at least one component of one or more components of a computing device, which includes to receive a second indication that the at least one component is power restricted or thermally restricted, and to determine how to reduce power consumption of the at least one component; and
a configuration setting controller circuit to set a state of the at least one component, which includes to set the at least one component in a boost mode state as a default power configuration state based on the system being powered on, subsequently use the first indication from the power reduction controller circuit to set the at least one component in a reduced power state, to maintain a record of at least one of an order in which the one or more components are set to the reduced power state or an amount by which power consumption of each of the one or more components was reduced, and to return, based at least in part on the record, the one or more components to the boost mode state in the order in which the one or more components were set to the reduced power state.

13. The system of claim 12, the boost mode state including a higher power consumption setting than a steady state, the steady state being a maintainable state at which the at least one component is able to operate indefinitely without exceeding a power threshold or thermal threshold for the at least one component.

14. The system of claim 12, wherein the boost mode state of the at least one component includes the at least one component running at a higher frequency than when in a steady state.

15. The system of claim 12, the configuration setting controller circuit being further to:
  detect that the one or more components are able to return to the boost mode state; and
  wherein the return, based at least in part on the record, of the one or more components to the boost mode state includes increasing the power consumption of each of the one or more components by the amount by which the power consumption of the one or more components was reduced.

16. A computing device comprising:
  one or more components; and
  a default boost controller circuit to set each of the one or more components in a boost mode state based on the computing device being powered on, detect that at least one component of the one or more components is power restricted or thermally restricted, set, in response to detecting that the at least one component is power restricted or thermally restricted, the at least one component in a reduced power state, maintain a record of at least one of an order in which the one or more components are set to the reduced power state or an amount by which power consumption of each of the one or more components was reduced, and return, based at least in part on the record, the one or more components to the boost mode state by increasing the power consumption of each of the one or more components by the amount by which the power consumption of the one or more components was reduced.

17. The computing device of claim 16, the boost mode state including a higher power consumption setting than a steady state, the steady state being a maintainable state at which the at least one component is able to operate indefinitely without exceeding a power threshold or thermal threshold for the at least one component.

18. The computing device of claim 16, the one or more components including multiple components, the default boost controller circuit being further to repeat the detecting and setting for each of the multiple components.

19. The computing device of claim 16, the default boost controller circuit being further to:
  detect that the one or more components are able to return to the boost mode state; and
  wherein the return, based at least in part on the record, of the one or more components to the boost mode state includes return of the one or more components to the boost mode state seriatim in the order in which the one or more components were set to the reduced power state.

20. The computing device of claim 16, the one or more components including multiple components, the default boost controller circuit being further to select the reduced power state for each of the multiple components to reduce power consumption of each of the multiple components proportionally.

* * * * *